(12) United States Patent
Mizobe et al.

(10) Patent No.: US 6,195,894 B1
(45) Date of Patent: *Mar. 6, 2001

(54) BICYCLE CRANK AND METHOD FOR MANUFACTURING SAME

(75) Inventors: Eiji Mizobe, Sakai; Yamanaka Masahiro, Izumisano, both of (JP)

(73) Assignee: Shimano, Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/262,138

(22) Filed: Mar. 3, 1999

Related U.S. Application Data

(62) Division of application No. 08/993,449, filed on Dec. 18, 1997.

(30) Foreign Application Priority Data

Dec. 27, 1996 (JP) .................................................. 8-358090

(51) Int. Cl.⁷ .................................................. B21D 53/86
(52) U.S. Cl. ...................... 29/897.2; 29/527.3; 29/527.5; 29/527.6; 74/594.1; 164/132; 164/98
(58) Field of Search .................... 29/897.21, 527.1, 29/527.2, 527.3, 527.5, 527.6, 530, 424; 74/594.1, 594.2, 594.3, 594.4, 594.5, 579 R, 579 E, 579 F; 164/132, 98, 137; D12/123; 280/259

(56) References Cited

U.S. PATENT DOCUMENTS

| | | | |
|---|---|---|---|
| 2,070,589 | * | 2/1937 | Giacchino .................. 29/888.451 |
| 3,786,543 | * | 1/1974 | Sato ................................ 29/424 |
| 4,186,586 | * | 2/1980 | Takamura et al. ................ 72/264 |
| 5,027,497 | * | 7/1991 | Takaki et al. ................... 29/527.5 |
| 5,197,353 | * | 3/1993 | Trenerry et al. ................. 74/594.1 |
| 5,609,070 | * | 3/1997 | Lin et al. ....................... 74/594.1 |
| 5,623,856 | * | 4/1997 | Durham .......................... 72/594.1 |
| 5,907,896 | * | 6/1999 | Tseng ............................... 29/424 |
| 6,058,803 | * | 5/2000 | Yamanaka ....................... 74/594.1 |

FOREIGN PATENT DOCUMENTS

| | | |
|---|---|---|
| 48-7948 | 1/1973 | (JP) . |
| 58-93554 | 6/1983 | (JP) . |
| 60-13761 | 9/1985 | (JP) . |
| 61-150691 | 9/1986 | (JP) . |
| 61-121391 | 8/1996 | (JP) . |

* cited by examiner

*Primary Examiner*—I Cuda Rosenbaum
*Assistant Examiner*—Trinh Nguyen
(74) *Attorney, Agent, or Firm*—James A. Deland

(57) ABSTRACT

A crank arm for a bicycle includes a crank arm body having a pedal attachment hole on a first end thereof and a spindle attachment hole on a second end thereof. The crank arm body defines an elongated interior cavity surrounded by a shell, wherein the interior cavity is open to an exterior of the crank arm body. The opening can be used to access the cavity during and after manufacturing. The shape of the cavity may be varied to produce a lightweight yet strong structure. In the method used to form the crank arm body, a mold core formed by a shell containing a sand-like filler material is positioned into a casting mold so that a melt space is formed around the mold core, molten metal is poured into the casting mold, and the molten metal is solidified to form a crank billet. The filler material may be removed through an opening in the crank billet. This may be accomplished by drilling the crank billet to form the pedal attachment hole in a location that communicates with the filler material and then removing filler material through the pedal attachment hole.

14 Claims, 5 Drawing Sheets

BICYCLE CRANK AND METHOD FOR MANUFACTURING SAME

CROSS REFERENCE TO RELATED APPLICATIONS

This application is a division of copending application Ser. No. 08/993,449, filed Dec. 18, 1997.

BACKGROUND OF THE INVENTION

The present invention is directed to bicycle crank arms and, more particularly, to a bicycle crank arm that includes a shell to define an interior cavity or to hold a filler material.

It is desirable for a bicycle to be as lightweight as possible, so the bicycle parts should be reduced in weight as much as possible. This is true of bicycle cranks as well. A bicycle crank that is made lightweight by being manufactured in the form of a hollow tube is known from Japanese Patent Publication 2-18652, for example. Furthermore, a method for forming an internal cavity in a solid material by extrusion forging has also been proposed in Japanese Laid-Open Patent Application 5-116670. This hollow crank is obtained by the welding or plastic deformation of a pipe or crank billet, but this method affords little freedom in the design of the crank shape. The shape is further restricted because molding is impossible without certain portions that are otherwise unnecessary in terms of material dynamics, among other reasons. Another drawback is that a high quality appearance is difficult to achieve because of limitations in the machining process, despite demand for certain types of designs.

Methods for manufacturing a bicycle crank from a light alloy by casting are also known from Japanese Laid-Open Patent Application 58-93554. The shape restrictions noted above are eliminated with these casting methods, but forming a cavity on the inside is difficult with a crank because of the small size of the part, and the hollow interior can degrade the mechanical strength of the product. Accordingly, it has been proposed that a pipe or the like be integrally cast in the interior as shown in Japanese Laid-Open Utility Model Applications 48-7948 and 61-131391. Integrally embedding a pipe or other such member with high strength in the crank does indeed preserve the strength of the crank, but a problem remains in terms of making the product lightweight and strong at the same time.

SUMMARY OF THE INVENTION

The present invention is directed to a hollow bicycle crank that can be manufactured by casting while providing substantial design freedom. Such a crank can be lightweight while also being strong. In one embodiment of a bicycle crank according to the present invention, a crank arm for a bicycle includes a crank arm body having a pedal attachment hole on a first end thereof and a spindle attachment hole on a second end thereof. The crank arm body defines an elongated interior cavity surrounded by a shell, wherein the interior cavity is open to an exterior of the crank arm body. The opening can be used to access the cavity during and after manufacturing. The shape of the cavity may be varied to produce a lightweight yet strong structure. For example, the interior cavity may have a substantially semicircular cross sectional shape in proximity to the spindle attachment hole and a substantially rectangular shape in proximity to the pedal attachment hole, and a cross sectional diameter of the cavity may decrease from a central portion of the crank arm body to the first and second ends of the crank arm body. The cavity may be filled with a material having a lower specific gravity than the metal forming the crank arm to provide strength while still saving weight.

In one embodiment of a method used to form the crank arm body according to the present invention, a mold core formed by a shell containing a sand-like filler material is positioned into a casting mold so that a melt space is formed around the mold core, molten metal is poured into the casting mold, and the molten metal is solidified to form a crank billet. The filler material may be removed through an opening in the crank billet. This may be accomplished by drilling the crank billet to form the pedal attachment hole in a location that communicates with the filler material and then removing filler material through the pedal attachment hole.

Since the crank of the present invention, and the manufacturing method therefor, have a core on the inside of the crank, the crank is lightweight and yet rigid. Furthermore, since the crank is manufactured by casting, it can be designed in any shape, allowing a greater degree of latitude in design, so it is easier to achieve a high-quality appearance. If the cast blank is also mold-forged, the product is lightweight and also has sufficient strength. Also, since a core containing a filler is positioned on the inside of the crank arm, the shape of the core is not flattened during mold forging.

DETAILED DESCRIPTION OF THE EMBODIMENTS

Figure 1:
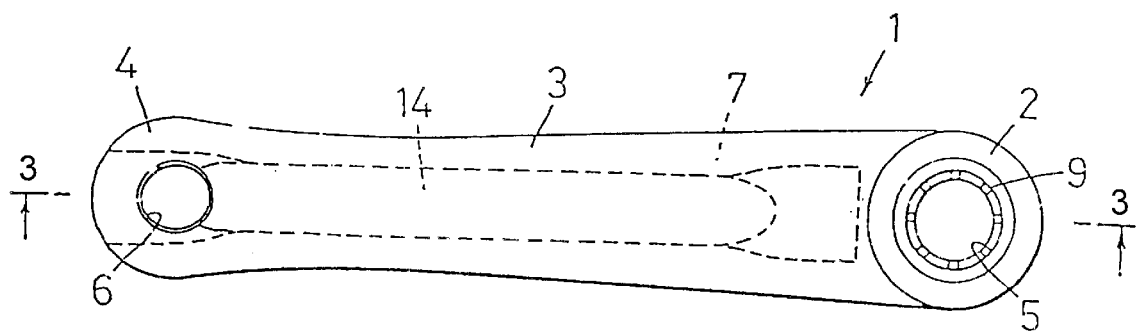
FIG. 1 is a rear view of a particular embodiment of a bicycle crank according to the present invention.
Figure 2:
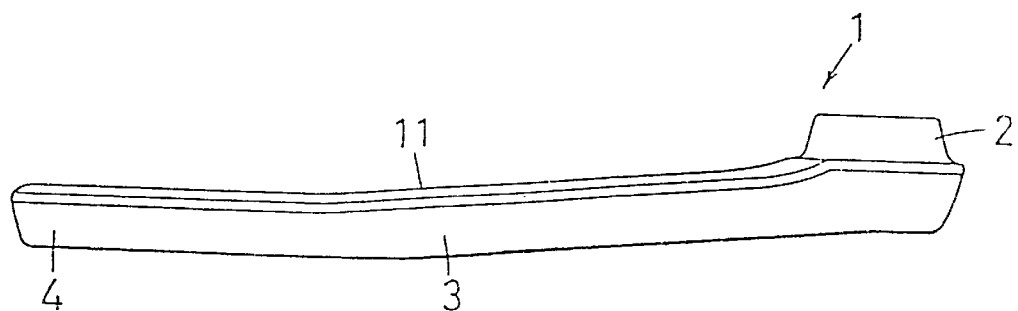
FIG. 2 is a side view of the bicycle crank shown in FIG. 1.

FIG. 1 is a rear view of a particular embodiment of a left side bicycle crank 1 according to the present invention. The left crank 1 is made from an aluminum alloy and, as shown in FIG. 1, is formed such that its cross section is narrower on the pedal spindle end 4 side where the pedal spindle (not shown) is attached and thicker on the crank spindle end 2 side where the crank spindle (not shown) is attached. Thus changing the cross sectional area by varying the thickness of the left crank 1 in different locations is intended to enhance strength such that the stress to which the left crank is subjected is more or less the same everywhere in the cross section. A chamfered section 11 (see FIG. 2) is formed along both edges on the back side of the left crank 1.

A pedal attachment hole 6 for attachment of a pedal spindle (not shown) is formed in the pedal spindle end 4 on the pedal attachment side of the left crank 1. A crank spindle attachment hole 5 for attaching the left crank 1 to the crank spindle by inserting the spindle into the crank spindle attachment hole 5 is formed at the crank spindle end 2 of the left crank 1. More specifically, a flange 8 protrudes inward from the inner surface of the crank spindle attachment hole 5, and a male serration 9 is provided integrally on the rear surface side of this flange 8. In this example, the serration 9 has eight teeth, as shown in FIG. 1. If there are too few teeth, the strength of the rotational bond will be inadequate. On the other hand, if there are too many teeth the machining will be difficult, the cost will be higher, and there will be a higher incidence of errors in the positioning of indexing in the rotational direction during assembly.

The portion of the crank spindle attachment hole 5 to the rear of the serration 9 is structured as a centering component (also called a guide component) 10 that is a concentrically tapered hole. The centering component 10 is in the form of a cylindrical tapered hole that widens to the rear, and, in this example, it is formed at a taper angle of 2° to 3°. The taper surface of the centering component 10 is snugged up against the taper surface of the centering component of the crank spindle (not shown), which accurately aligns the two centers and also links them together integrally and securely.

Figure 3:
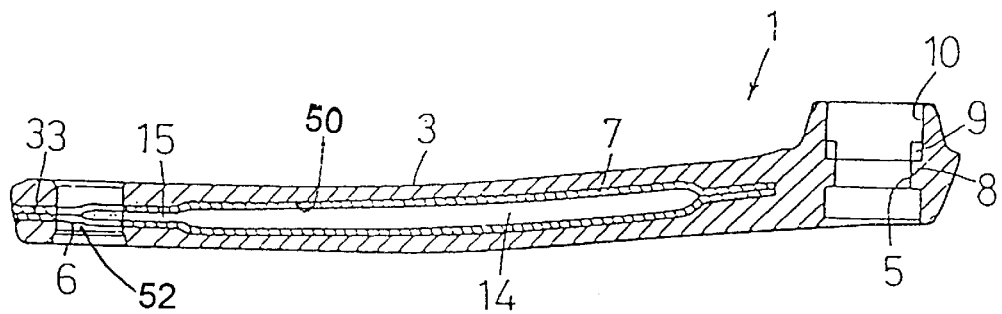
FIG. 3 is a cross sectional view of the bicycle crank taken along line III—III in FIG. 1.
Figure 4:
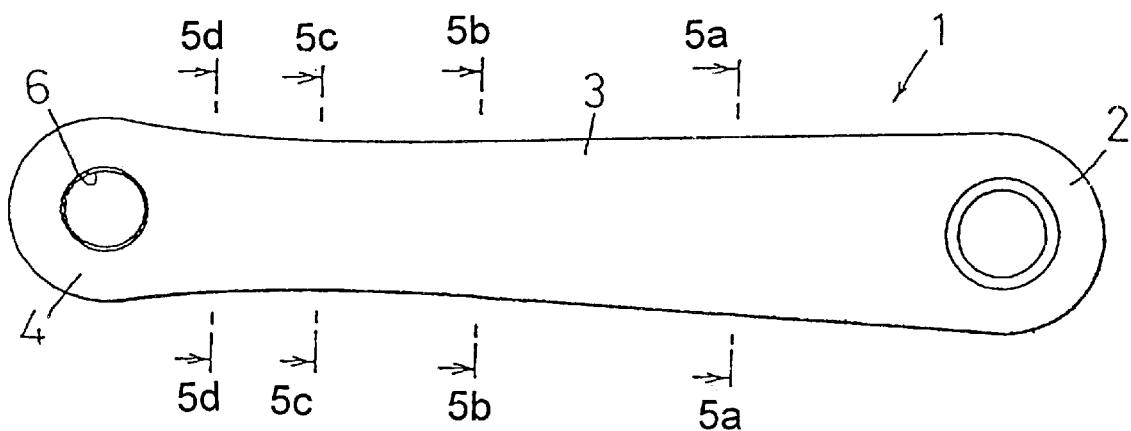
FIG. 4 is a front view of the bicycle crank shown in FIG. 1.
Figure 5A:
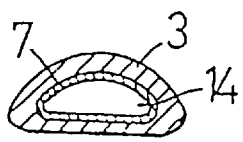
FIG. 5(a) is a view taken along line Va—Va in FIG. 4.
Figure 5B:
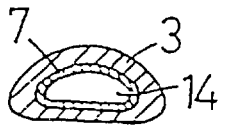
FIG. 5(b) is a view taken along line Vb—Vb in FIG. 4.
Figure 5C:
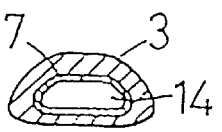
FIG. 5(c) is a view taken along line Vc—Vc in FIG. 4.
Figure 5D:
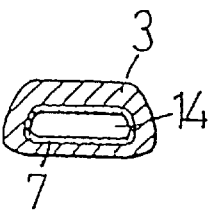
FIG. 5(d) is a view taken along line Vd—Vd in FIG. 4.

As shown in FIGS. 1, 3 and 5(*a*)–(*d*), a pipe core 7 made from pure aluminum is formed along the pedal spindle end 4 side and the crank spindle end 2 side centering on the crank center 3, wherein the cross sectional structure of the pipe core 7 is shown in FIGS. 5(*a*)–(*d*). More specifically, the cross sectional structure of the pipe core 7 is such that the shape is semicircular on the crank spindle end 2 side, and this shape flattens out to a rectangular shape on the pedal spindle end 4 side. The cross sectional area of the pipe core 7 continuously decreases, and the height is at a minimum at the two ends. In other words, the shape of the pipe core 7 approximates that of a ship hull. The weight of the left crank 1 is reduced by the pipe core 7 on the interior of the crank center 3. The pipe core 7 also contributes to flexural and other aspects of mechanical stress. The metal of the pipe core 7 may be the same as the metal that makes up the left crank 1, but preferably should have as low a specific gravity as possible, be resistant to heat, and be able to withstand the pressure of forging as discussed below.

There is an opening 15 on the pedal spindle end 4 side of the pipe core 7. The opening 15 communicates with the internal cavity 14 of the pipe core 7, as discussed below. The internal cavity 14 is temporarily filled with sand or another filler. The filler packed into the pipe core 7 prevents the pipe core 7 from being crushed by the pressure of hot forging. The filler need not be taken out as discussed below, and may instead remain packed inside the finished product.

Figure 6:
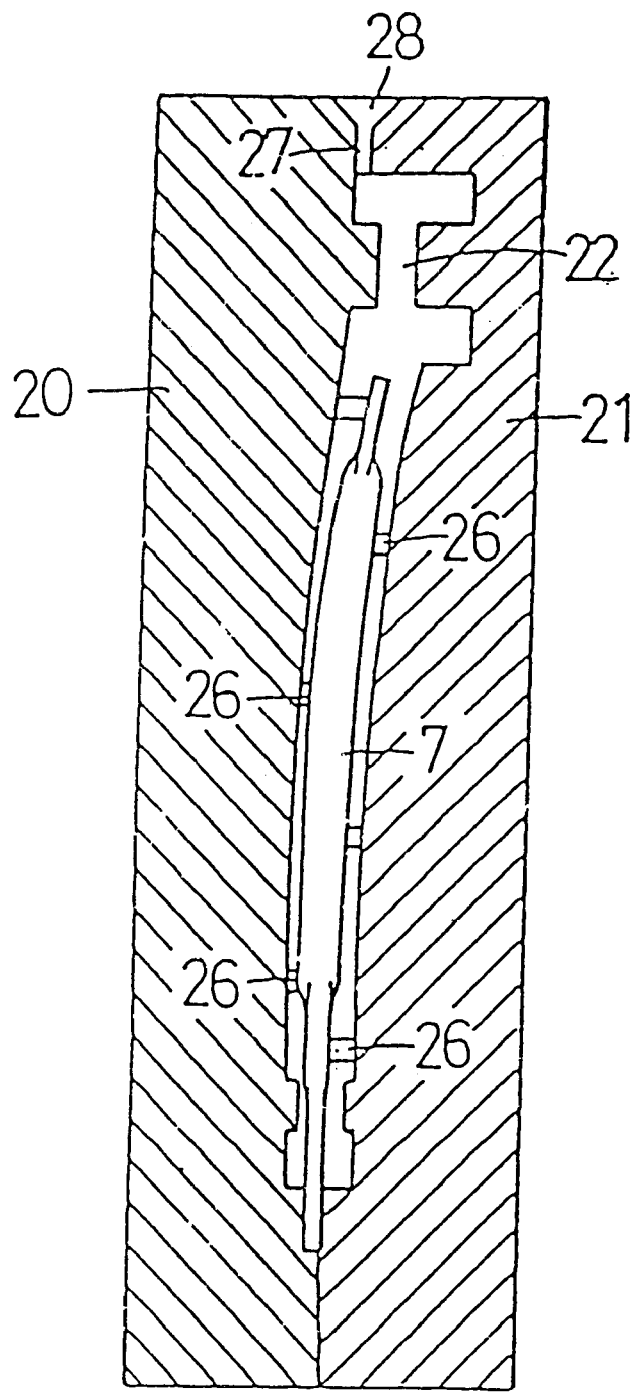
FIG. 6 is a cross sectional view of a particular embodiment of a casting mold used in the method of manufacturing a bicycle crank according to the present invention.

The left crank 1 may be manufactured by the following method. FIG. 6 is a cross sectional view of the molding apparatus during initial casting. A melt space 22, into which the molten metal is allowed to flow between the metal mold 20 and the metal mold 21, is demarcated within the metal mold 20 and the metal mold 21. The melt space 22 is demarcated in a shape roughly corresponding to the left crank 1, but the melt space 22 is slightly larger to accommodate the shrinkage of the molten metal. The pipe core 7 is inserted into the melt space 22.

Figure 7:
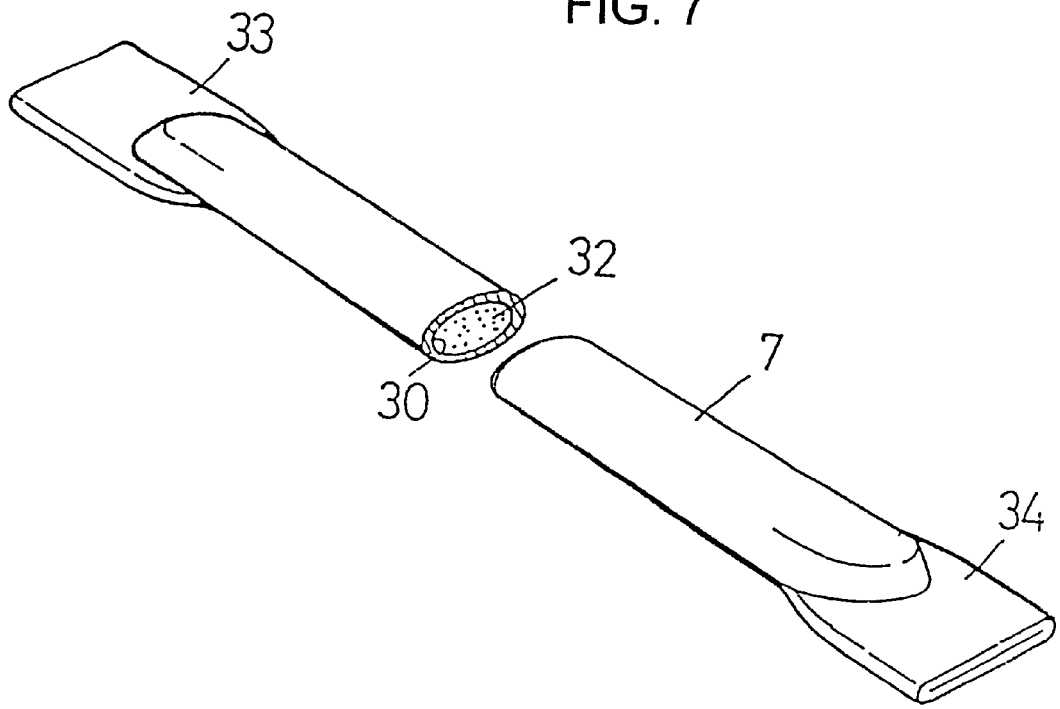
FIG. 7 is an oblique projection of a particular embodiment of a mold core according to the present invention showing the filler material surrounded by a shell.

The pipe core 7 may be made by baking foamed volcanic glass. FIG. 7 is an oblique projection of the mold core mold. Volcanic glass or another sand-like filler 32 is poured into the internal hole 30 of the pipe core 7. The filler 32 may be made of any material that is resistant to the heat of the molten metal and is able to withstand the compression load created by forging (discussed below). After the pipe core 7 has been filled with the filler 32, it is pressed and sealed by the provision of flattened components 33 and 34 at both ends. One of the flattened components 33 is integrally cast and fuses with the molten metal, thus constituting the pedal spindle end 4 of the left crank 1.

The pipe core 7 is positioned within the melt space 22 as shown in FIG. 6. In order for the pipe core 7 to be accurately positioned within the melt space 22, spacers 26 made from foamed styrene or the like are used to position the pipe core 7. The melt space 22 communicates with a sprue 28 via a runner 27.

A molten aluminum alloy is poured into the sprue 28, goes through the runner 27, and enters the melt space 22. The molten metal applies pressure to the melt space 22 by gravitational force. This casting method is a metal mold casting method, also called metal mold gravity casting, in which ordinary casting is performed without any pressure being applied to the molten metal, using only gravitational pressure.

With casting alone, blowholes and the like can occur in the metal texture in the interior. Therefore, the casting is subjected to mold forging while the pipe core 7 is still inside the crank billet 29. With mold forging, the casting is placed in a semi-closed metal mold 35 that is used for semi-closed forging, and is hot forged therein.

Figure 8:
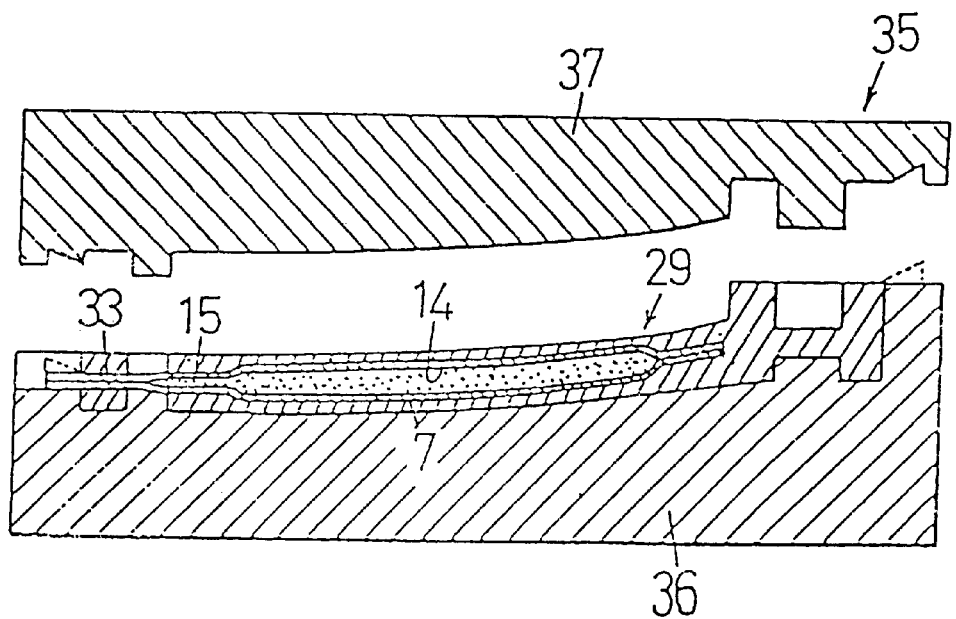
FIG. 8 is a cross sectional view of the crank billet being placed in a forging mold.

FIG. 8 is a cross section of the state when the crank billet 29 has been put into a lower metal mold 36. The crank billet 29 is then heated to a specific temperature and placed in the lower metal mold 36, after which pressure is applied from an upper metal mold 37 to perform forging. As a result of this hot forging, the length, overall thickness, wall thickness, and surface of the cast crank billet 29 are precisely worked, the material of the crank billet 29 is tempered and homogenized, and the mechanical strength is increased. Because the pipe core 7 produced by this hot forging is still inside the crank billet 29 during the forging, the pipe core 7 is not crushed, and its shape is instead preserved.

Figure 9:
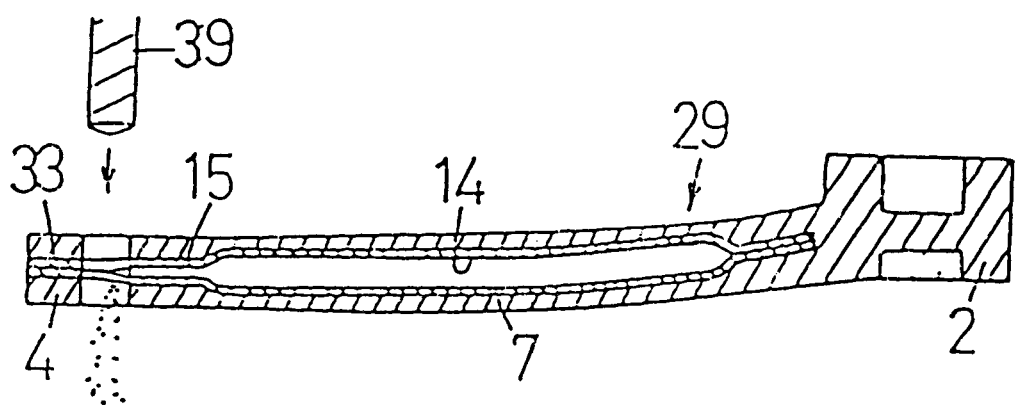
FIG. 9 is a cross sectional view of a method of removing the filler material from the crank billet.

As shown in FIG. 9, the filler 32 may be taken out from the opening 15 by drilling a lower hole in the pedal attachment hole 6 of the crank billet 29. The extra portion of the flattened component 33 is also cut off. After this, the casting is worked into the shape of the left crank 1 by cutting, grinding, polishing, or other such machining.

The following was used for the filler 32:

Trade name: "Terra Balloon" made by Calseed (8-2 Minami Kaigan, Itsui, Ichihara-Ichi, Chiba Prefecture)

Components (wt %): $SiO_2$ (77.3), $Al_2O_3$ (12.8), $Fe_2O_3$ (1.7), CaO (1.0), MgO (0.1), $Na_2O$ (3.2), $K_2O$ (2.9), $TiO_2$ (0.2), other (0.9)

Particle size ($\mu$m): 9.41 (10%), 27.71 (50%), 71.32 (90%)

Density: 0.30 light charge density, 0.46 heavy charge density, 1.14 particle density Heat resistance temperature (° C.): 1100

Figure 10:
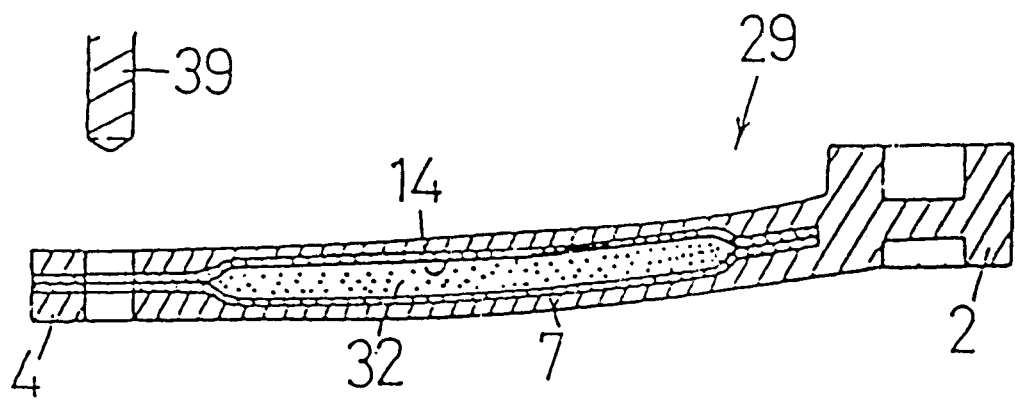
FIG. 10 is a cross sectional view of another embodiment of a crank billet according to the present invention.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. In the above embodiment, the filler 32 inside the pipe core 7 was taken out after forging, but it need not be taken out, and may instead be left packed inside the pipe core 7 as shown in FIG. 10. Also, volcanic glass was used for the filler, but other filler materials may also be used as long as they have a lower specific gravity than the matrix metal, have heat resistance against the molten metal, and have enough compression strength to withstand forging, such as natural pumice or foamed gypsum. Thus, the scope of the invention should not be limited by the specific structures disclosed. Instead, the true scope of the invention should be determined by the following claims.

What is claimed is:

1. A method of manufacturing a metal bicycle crank arm comprising the steps of:

positioning a core comprising a shell packed with a filler material having a specific gravity lower than a specific gravity of metal forming the bicycle crank arm into a casting mold so that a melt space is formed around the core;

pouring molten metal into the casting mold; and solidifying the molten metal to form a crank billet such that the core is integrally formed with the metal.

2. The method according to claim 1 wherein the casting mold comprises a metal mold gravity casting mold, and wherein the step of pouring the molten metal comprises the step of pouring the molten metal into the metal mold gravity casting mold so that the molten metal fills the melt space by gravity.

3. The method according to claim 1 further comprising the step of forging the crank billet.

4. The method according to claim 1 further comprising the step of forming the shell from metal.

5. The method according to claim 1 further comprising the step of removing the filler material through a first opening in the crank billet.

6. The method according to claim 5 wherein the step of removing the filler comprises the steps of:

drilling the crank billet to form the first opening, wherein the first opening communicates with the filler material in the shell; and removing the filler material through the first opening.

7. The method according to claim 6 wherein the step of drilling the crank billet comprises the step of drilling the crank billet to form a pedal attachment hole that communicates with the filler material in the shell.

8. The method according to claim 1 further comprising the step of withstanding a compression load applied to the shell with the filler material to preserve a shape of the shell.

9. The method according to claim 3 wherein the step of forging the crank billet further comprises the step of withstanding a compression load applied to the shell with the filler material to preserve a shape of the shell.

10. A method of manufacturing a metal bicycle crank arm comprising the steps of, in the order listed:

positioning a core comprising a shell packed with a filler material having a specific gravity lower than a specific gravity of metal forming the bicycle crank arm into a casting mold so that a melt space is formed around the core;

pouring molten metal into the casting mold;

solidifying the molten metal to form a crank billet such that the core is integrally formed with the metal;

forging the crank billet; and removing the filler material through a first opening in the crank billet.

11. The method according to claim 10 wherein the casting mold comprises a metal mold gravity casting mold, and wherein the step of pouring the molten metal comprises the step of pouring the molten metal into the metal mold gravity casting mold so that the molten metal fills the melt space by gravity.

12. The method according to claim 10 wherein the step of removing the filler comprises the steps of:

drilling the crank billet to form the first opening, wherein the first opening communicates with the filler material in the shell; and removing the filler material through the first opening.

13. The method according to claim 12 wherein the step of drilling the crank billet comprises the step of drilling the crank billet to form a pedal attachment hole that communicates with the filler material in the shell.

14. The method according to claim 10 wherein the step of forging the crank billet further comprises the step of withstanding a compression load applied to the shell with the filler material to preserve a shape of the shell.

* * * * *